Nov. 7, 1933.  W. M. BAILEY  1,934,475

ELECTRIC CAPACITOR

Filed June 18, 1932  2 Sheets-Sheet 1

INVENTOR
WILLIAM M. BAILEY
BY Charles E. Mullan
ATTORNEY

Nov. 7, 1933.  W. M. BAILEY  1,934,475
ELECTRIC CAPACITOR
Filed June 18, 1932   2 Sheets-Sheet 2
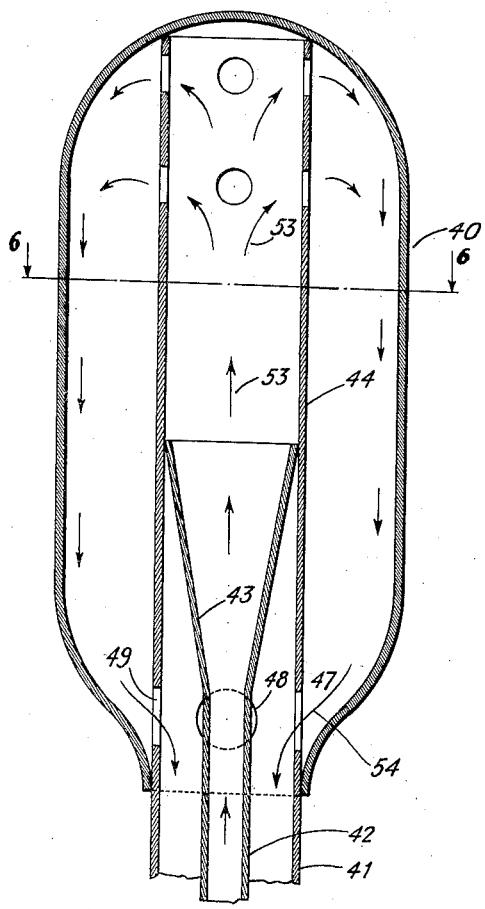
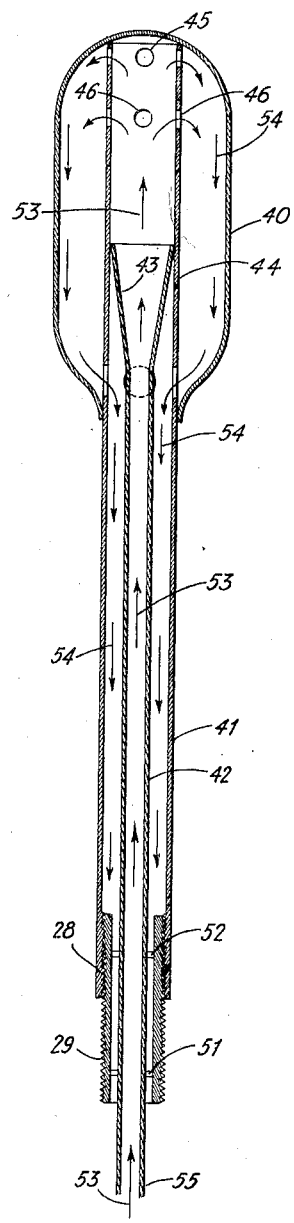
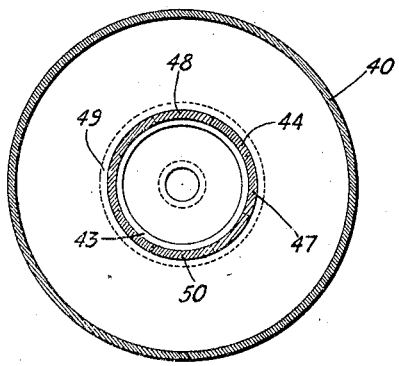
INVENTOR
WILLIAM M. BAILEY
BY Charles V. Mullen
ATTORNEY Patented Nov. 7, 1933

1,934,475

UNITED STATES PATENT OFFICE 1,934,475

ELECTRIC CAPACITOR

William M. Bailey, White Plains, N. Y., assignor to General Electric Company, a corporation of New York Application June 18, 1932. Serial No. 618,011

7 Claims. (Cl. 175—41)

This invention relates to an improved fluid cooled capacitor having a combination of capacities assembled together as a single unit, and more particularly, to such a capacitor which is adapted for use in short wave radio transmitting circuits utilizing relatively high potentials.

An object of this invention is to reduce internal heat losses developed within a capacitor by cooling the inner electrode with a continuous flow of cooling liquid.

Another object of this invention is to reduce the losses of a capacitor due to corona occurring when the capacitor is subjected to high frequencies and high potential stress.

Another object of this invention is to properly insulate and support a high potential electrode of a capacitor within a composite casing of insulating and metallic material, the insulating portion of this casing supporting and insulating the electrode, and the metallic portion serving as another electrode.

Another object of this invention is to provide a combined capacitor which may be substituted in a short wave radio transmitting circuit for one or more vacuum tubes when it is desired to reduce the power output of the transmitter and not alter the electrical balance of the transmitting circuit.

A feature of this invention is the novel and improved means of adjusting the outer electrode of the capacitor, which adjustment is desirable to compensate for most of the varying characteristics of commercial transmitting tubes.

In general, the particular form of capacitor about to be described, comprises three capacities formed by means of three separate electrodes, namely, an inner electrode, a casing electrode, and an outer electrode. When substituted for a vacuum tube in a high frequency circuit, the equivalent plate-to-grid capacity is determined by the fixed space between the inner and casing electrodes, and the interposed dielectric which preferably is of solid sulphur.

Although sulphur is a good dielectric and particularly adapted for high frequency and high voltage, it is not, however, a good conductor of heat; therefore, in order to remove the heat developed at the inner electrode, cooling fluid is continuously brought into contact with the inner electrode which is made hollow for this purpose.

The equivalent grid-to-filament capacity is determined by the spacing between the casing electrode and the outer electrode and the interposed dielectric, which, for this purpose, may be air. The latter electrode is mounted on an insulator placed upon the top of the casing electrode. Suitable means is provided to alter the distance between the casing electrode and the outer electrode in order to alter the capacity existing therebetween.

The equivalent plate-to-filament capacity is determined by the spacing of all three electrodes and the interposed sulphur and air dielectrics.

In the drawings like reference numerals refer to similar parts throughout the several views.

Referring now to the drawings, Fig. 1 is a vertical cross section of my improved capacitor;

Fig. 5 is a detailed vertical cross section of the improved water-cooled plate electrode;

Fig. 6 is a cross section, the section being taken on lines 6—6 of Fig. 5, and

Fig. 7 is a vertical cross section of the improved water-cooled plate electrode.

Figure 1:
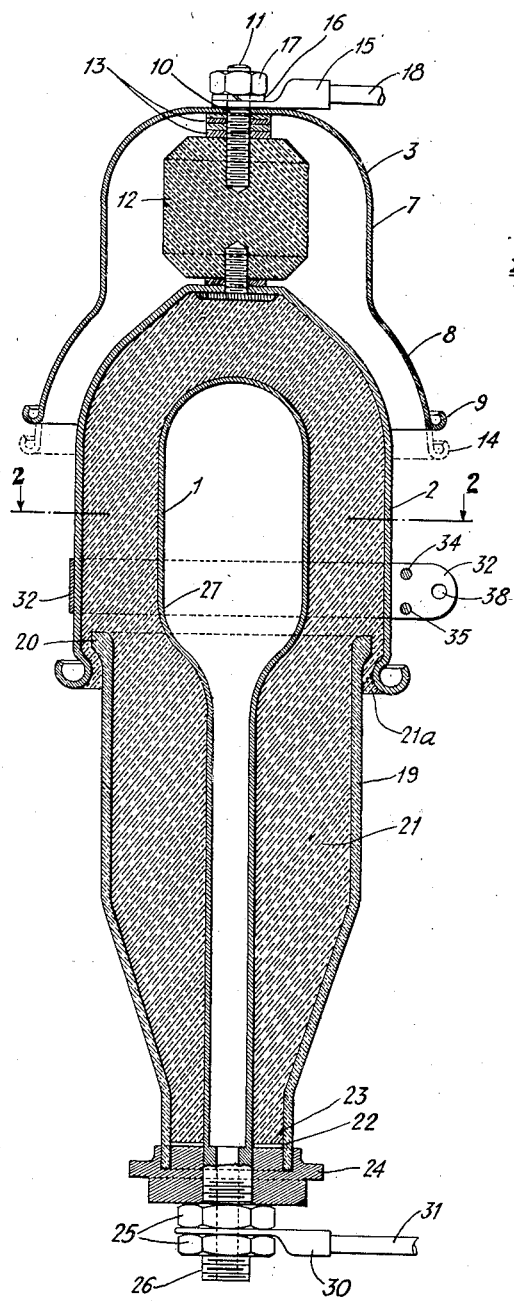
Figure 2:
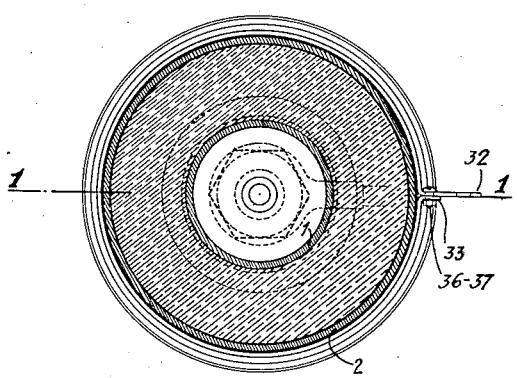
Fig. 2 is a horizontal cross section of my capacitor, the section being taken on lines 2—2 of Fig. 1.

Referring now to Figs. 1 and 2, the improved combined capacitor of my present invention comprises the inner electrode 1 which is composed of aluminum, or any other suitable metal, the casing electrode 2, and the outer electrode 3.

When this combined capacitor is used to replace a vacuum tube in a circuit, the electrode connections should correspond generally to the plate, grid and filament metallic members, respectively, of the replaced vacuum tube.

Figure 4:
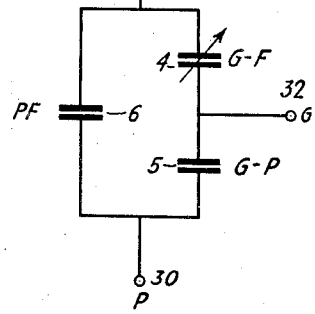
Fig. 4 is a diagram indicating the three equivalent capacities formed by my improved combined capacitor.

The equivalent arrangement of capacities formed by my capacitor, is best shown by Fig. 4. The grid, filament and plate connections have been lettered G, P and F, and the capacities between the members are indicated by P—F, to indicate the plate-filament capacity, G—P the capacity between the grid and plate of the tube to be replaced, and G—F the equivalent grid to filament capacity.

The capacity 4 or G—F, has a maximum value of approximately 18 micromicrofarads between the grid and filament, the capacity 5 or G—P, is approximately 27 micromicrofarads between the plate and grid, and the capacity 6 is approximately 10.8 micromicrofarads between the plate and filament for the average tube.

The adjustable grid-to-filament capacity comprises the electrode 3 having an inverted cup-shaped portion 7 with a skirt portion 8 which is provided with a rolled or crimped edge 9 which serves a dual purpose; namely, as a stiffener for the free edge of the electrode and as a corona shield. The top of the electrode 3 is provided with an apertured portion 10 which is threaded to receive the terminal stud 11 mounted on the insulating member 12, of mycalex or any other suitable insulating material. When it is desired to change the capacity between the outer electrode 3 and the casing electrode 2 a plurality of washers 13 are provided. By removing a proper number of these washers the outer electrode can be lowered to a position indicated by the dotted lines at 14.

The stud 11 is provided with a terminal lug 15, lock washer 16, and nut 17. A suitable terminal lead 18 is soldered in the lug 15. Proper electrical connection is made to the casing electrode 2 by means of a wide metal band 32 which completely surrounds the casing, and is joined at a point 33 by means of screws 34 and 35 which are provided with clamping nuts 36 and 37. The end of the band 32 is provided with an aperture 38 for fastening a suitable connection lug (not shown).

The lower portion of this improved capacitor is provided with an insulating casing 19 of pyrex glass, fused quartz, or any other suitable insulating material which is capable of withstanding high voltage stress.

Figure 3:
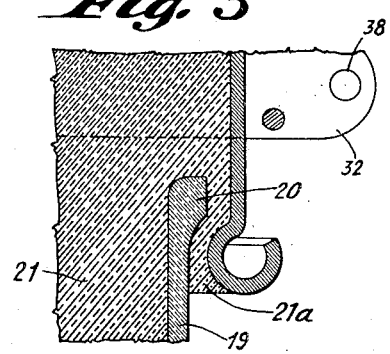
Fig. 3 is a fragmentary vertical section of the improved capacitor, the section being taken where the insulating casing and the outer metallic electrode are joined.

The upper portion of this composite cylindrical insulating casing member 19 is provided with a flanged portion 20 which provides an improved lock joint to reduce the losses due to corona at the point of high potential stress where the insulating casing and the casing electrode 2 join, and is shown in more detail by Fig. 3. This improved lock joint and seal is so designed and arranged that any mechanical stress placed on the composite casing structure as a whole, places the sulphur in compressive stress, which is an improvement over the usual form of joint where the cementing material is generally in tensional stress.

The solid sulphur dielectric 21 is molded in place by inverting the complete assembly and holding the inner electrode 1 and metal casing 2 in proper relation with the insulating casing 19 by a suitable fixture, then pouring in molten sulphur through the necked portion 22 of the insulating casing 19. In the filling of the space between the electrodes 1 and 2 the sulphur is allowed to flow between the flanged portion 20 and the casing electrode 2, indicated by 21a, thus providing the very efficient low-loss lock joint and seal mentioned above.

After the molten sulphur has filled the composite casing to a level approximate to that indicated at 23, a cap 24 composed of aluminum or any other suitable metal, which is adapted to fit into a tube socket of standard size, is placed over the lower end of the necked portion 22 of the insulating casing 19. This cap 24 is retained in place by means of suitable lock nuts 25 which are threaded on the lower or stud portion 26 of the electrode 1.

Referring now in more detail to the inner electrode 1, this member comprises an enlarged portion 27 which is made slightly smaller than the inside diameter of the necked portion of the insulating casing 19 so that it may be readily passed through the necked portion 22 in assembling.

The inner electrode 1 is made hollow either by casting one piece of metal or building it up of thin metallic sheets and tubing so that a stream of water may be circulated up through the active portion of this inner electrode in order to effectively remove the heat generated at the electrode during the operation of the short wave transmitter.

The lower portion of the inner electrode consists of a stud which passes down through the insulating portion 19 of the casing and terminates in the threaded stud portion 26 which provides an electric connection that is made through the terminal lug 30 and the terminal lead 31.

Referring now to Figs. 5, 6 and 7, illustrating an improved inner electrode, a hollow bulb-like portion 40 is mounted on a tubular stud portion 41, through which the cooling liquid flows. The cooling liquid which may be under pressure, is forced up through the inner tubular member 42 which is flared at the top in a funnel-like configuration at 43. Surrounding the funnel-like portion 43 a cylindrical liquid diffusing member 44 is shown and is provided with suitable apertures 45 and 46 through which the cooling liquid flows and returns through apertures 47, 48, 49 and 50 down the inner portion of the stud 41. Suitable spiders 51 and 52 are provided to properly space the tube 42 centrally within the tube 41. The cooling liquid circulates through the above mentioned members as indicated by the upward arrows 53 and the downward arrows 54. The inlet and outlet cooling fluid connections are made at 55 and 29 by any suitable fluid supply means.

As mentioned above, this improved combined capacitor has a highly efficient form of, and rapid internal heat remover. Since, at high frequencies, the electrical currents concentrate themselves at or near conducting surfaces, the efficiency of the present invention should at once be apparent.

Although a preferred form of this invention has been described and illustrated, it, of course, is not to be limited thereto but is to be given the full breadth and scope indicated by the appended claims.

I claim:

1. A high tension capacitor comprising a lower insulating portion, an upper metallic portion forming an outer electrode, an inner electrode concentrically contained within said outer electrode and lower insulating portion and spaced therefrom, and a solid dielectric interposed between said outer and inner electrodes and extending downwardly between said inner electrode and said insulating portion.

2. A capacitor comprising in combination three electrodes, one of said electrodes being supported by insulating means from the second electrode with an interposed air dielectric, a sulphur dielectric interposed between the second and third electrodes, and means within the said third electrode providing passages for circulation of a cooling fluid to remove heat from said inner electrode.

3. A capacitor comprising an outer electrode, a casing electrode within said outer electrode, a dielectric of air interposed between said outer electrode and said casing electrode, a hollow inner electrode, a sulphur dielectric interposed between said casing electrode and the inner electrode, and a tubular member concentric to and mounted within said inner electrode, there being openings in said tubular member providing passages for circulation of a cooling fluid to remove heat from said inner electrode.

4. A capacitor having a plurality of outer electrodes and an inner electrode, a solid sulphur dielectric interposed between one of said outer electrodes and the inner electrode, means providing passages for circulation of a cooling fluid to remove heat from said sulphur dielectric, and means for changing the spacing and hence the capacity values between said outer electrodes.

5. A capacitor having an inner electrode, a lower insulating casing surrounding the lower portion of said inner electrode, an upper metallic casing electrode surrounding the upper portion of the inner electrode, a sulphur dielectric interposed between the inner electrode and the insides of the insulating casing and the metallic casing electrode, an insulator secured at the top of said metallic casing electrode, and an outer electrode secured to the top of said insulator.

6. A capacitor having a hollow inner electrode, a lower insulating casing surrounding the lower portion of said hollow inner electrode, an upper metallic casing electrode surrounding the upper portion of said hollow inner electrode, a sulphur dielectric interposed between the hollow inner electrode and the insides of the insulating casing and metallic casing electrode, an insulator secured at the top of said metallic casing electrode, an outer electrode secured to the top of said insulator, and means within said hollow inner electrode providing passages for circulation of a cooling fluid.

7. A capacitor having an inner electrode, a lower insulating casing surrounding the lower portion of said inner electrode, an upper metallic casing electrode surrounding the upper portion of said inner electrode, a sulphur dielectric interposed between the inner electrode and the insides of the insulating casing and the metallic casing electrode, an insulator secured at the top of said metallic casing electrode, and an outer adjustable electrode secured to the top of said insulator.

WILLIAM M. BAILEY.